Figures 1, 2:
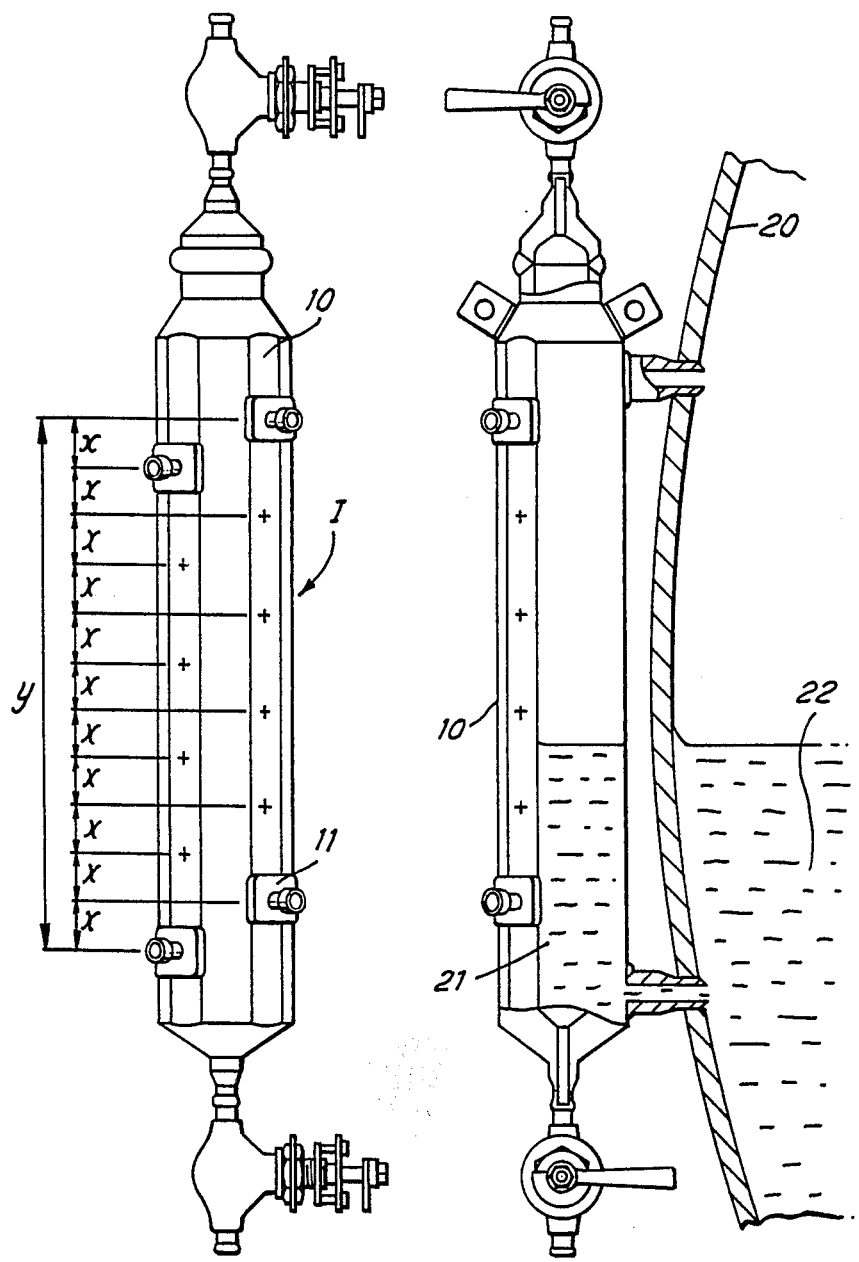

United States Patent [19]

Cosser

[11] Patent Number: 4,711,117

[45] Date of Patent: Dec. 8, 1987

[54] SIDE ARM FLUID LEVEL GAUGE WITH SPACED-APART SENSORS FOR DENSITY ERROR COMPENSATION

[75] Inventor: Harry F. Cosser, Fleet, England

[73] Assignee: Schlumberger Electronics, Inc., Hants, England

[21] Appl. No.: 730,537

[22] Filed: May 6, 1985

[30] Foreign Application Priority Data

May 16, 1984 [GB] United Kingdom ............. 8412460

[51] Int. Cl.$^4$ .................. G01F 23/02; G01F 23/22
[52] U.S. Cl. ......................... 73/1 H; 73/291; 73/447
[58] Field of Search .......... 73/304 R, 326, 328, 73/447, 1 H, 291; 340/618

[56] References Cited

U.S. PATENT DOCUMENTS

| | | | |
|---|---|---|---|
| 2,351,099 | 6/1944 | Brelsford | 73/328 X |
| 2,398,375 | 4/1946 | Heenan | 73/301 |
| 3,389,250 | 6/1968 | Clemens | 73/290 R |
| 3,416,372 | 12/1968 | Chen | 73/301 X |
| 3,443,438 | 6/1969 | Martin et al. | 73/304 R |
| 3,713,338 | 1/1973 | Kind | 73/323 X |
| 3,947,692 | 3/1976 | Payne | 73/304 R X |
| 4,020,488 | 4/1977 | Martin et al. | 340/412 |
| 4,142,419 | 3/1979 | Fenne et al. | 73/447 X |
| 4,169,377 | 10/1979 | Scheib | 73/304 R |
| 4,213,339 | 7/1980 | Shannon | 73/304 R |
| 4,284,343 | 8/1981 | Junghanns | 73/304 R |
| 4,297,081 | 10/1981 | Irvin | 73/1 H X |
| 4,355,363 | 10/1982 | Colby et al. | 73/304 C X |
| 4,373,389 | 2/1983 | Decker | 73/304 C |
| 4,420,976 | 12/1983 | Orloff et al. | 73/304 C |

FOREIGN PATENT DOCUMENTS

| | | |
|---|---|---|
| 234839 | 11/1925 | United Kingdom . |
| 262045 | 7/1926 | United Kingdom . |
| 603217 | 6/1948 | United Kingdom . |
| 820963 | 9/1959 | United Kingdom . |
| 1056032 | 1/1967 | United Kingdom . |
| 1257737 | 12/1971 | United Kingdom . |
| 1398957 | 6/1975 | United Kingdom . |
| 1438271 | 6/1976 | United Kingdom . |

Primary Examiner—Daniel M. Yasich
Attorney, Agent, or Firm—Dale Gaudier

[57] ABSTRACT

In fluid level measurement apparatus a pressure vessel is tapped into a fluid container the fluid level in which is to be measured such that fluid level in the vessel is representative of fluid level in the container. A plurality of fluid detecting sensors are mounted in the vessel with unequal spacing to compensate for level errors due to density differences between the fluid in the vessel and container.

4 Claims, 4 Drawing Figures

SIDE ARM FLUID LEVEL GAUGE WITH SPACED-APART SENSORS FOR DENSITY ERROR COMPENSATION

This invention relates to the measurement of fluid level, and in particular to the measurement of fluid level within a closed vessel, for example, a boiler subject to internal pressure variation.

In fluid level detection the different resistivity of fluids may be exploited to detect fluid level, for example the change in conductive medium from water to steam between an electrode pair as water level falls in a boiler. Level may be indicated by providing a plurality of sensors over a range of interest and diplaying the results. Such a system has the advantage of being self validating, it being evidence of an error if for example water is detected above steam in a boiler.

In high pressure boiler systems it is customary for sensors to be provided in a separate side tank tapped into the boiler pressure vessel over the level range of interest, on the assumption that there will be a common level. In this side-arm type of gauge inherent heat losses reduce the liquid column temperature in the pressure vessel, and consequently the gauge water density will be higher than that of the boiler drum liquid and the system will balance with the level of the gauge liquid below the level of drum liquid. Such a density error can be very significant at high pressures. For example in a conventional water level gauge the error may be in the region of 50% above mid-scale water levels.

It is known for high pressure vessels to be thermally designed so that the heat released by condensing steam in the upper part of the pressure vessel flows down the vessel walls to supply a large proportion of the heat loss from the lower half of the vessel. The greater the heat flow down the walls then the smaller is the heat drawn from the water thus maintaining the water at a higher temperature. The condensate also contributes to maintaining a higher water temperature. For example, careful design can reduce density error to about 15%. However such improvement is achieved only at the expense of thorough thermodynamic analysis of the system, and use of materials having high thermal conductivity. General such vessels are thick walled to promote conduction and hence bulky.

According to the present invention fluid level measurement apparatus for the measurement of fluid level in a container includes a pressure vessel tapped into the container such that fluid level in the vessel is representative of fluid level in the container and a plurality of spaced apart fluid sensitive sensors mounted in the vessel.

Wherein the spacing between the sensors is determined in accordance with errors arising from density difference between fluid in the container and fluid in the pressure vessel.

The spacing between sensors is advantageously made equivalent to equal increments of level in the container.

In a preferred form of the present invention, the spacing between sensors representing a first level increment is reduced compared with that between sensors representing a second and lower level increment. Preferably the spacing is varied such that for equal increments of level (P) in the container the $n^{th}$ sensor is mounted in the vessel at a level of n.p. (1−e) where e is given with sufficient accuracy by the formula:

$$e = \frac{V_1 - V_2}{V_s - V_2} \cdot \frac{V_s}{V_1}$$

Where for the normal operating pressure:
 $V_1$ is the specific volume of water in the container
 $V_2$ is the specific volume of water in the vessel as defined by the derived mean temperature of the water in the vessel for the particular level.
 $V_s$ is the specific volume of saturated steam.

Figure 3:
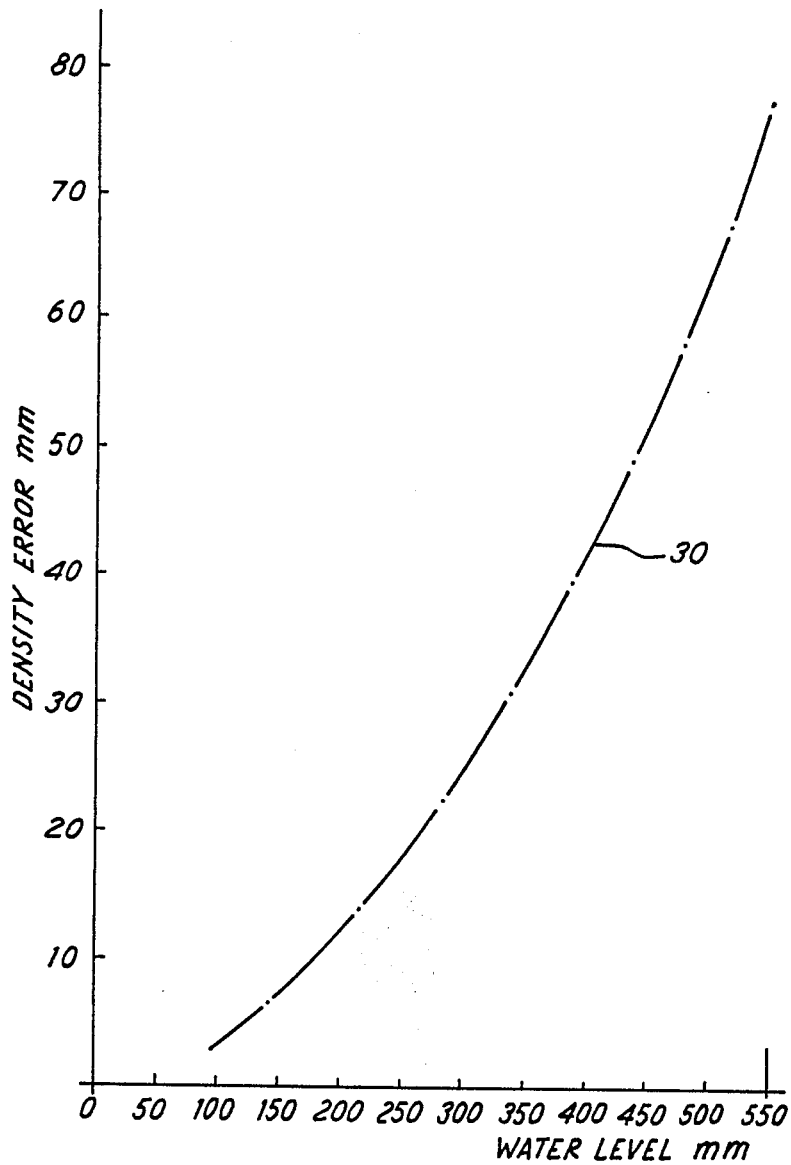
Figure 4:
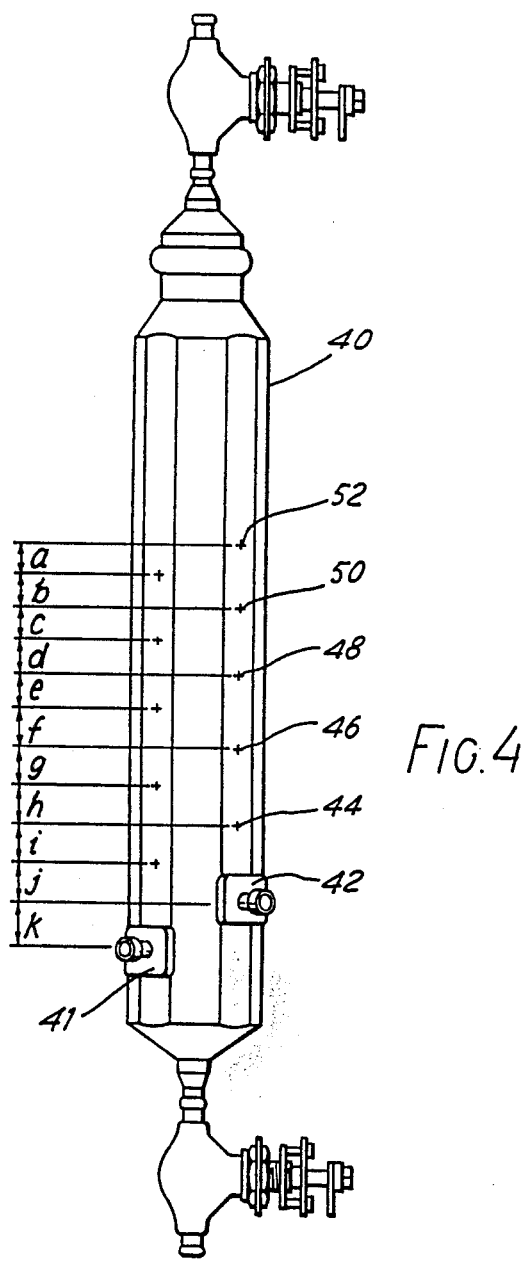

In order that features and advantages of the present invention may be appreciated an embodiment will now be described by way of example only with reference to the accompanying diagrammatic drawings, in which:

FIG. 1 represents a prior art pressure vessel,
FIG. 2 represents a view from direction I of the vessel of FIG. 1,
FIG. 3 represents density errors measured in the vessel of FIG. 1, and
FIG. 4 represents a pressure vessel in accordance with the present invention.

In prior art pressure vessels for use in a fluid level measurement system of the side arm type (FIG. 1) a vessel 10, carries an opaque plurality of fixed spaced apart sensors, such as sensor 11.

In use the vessel 10 is tapped into a boiler drum 20 (FIG. 2) such that the level of fluid 21 in the vessel is representative of the level of fluid 22 in the drum 20. The sensors are equally spaced with a spacing x, so that fluid level may be quantized to the nearest x over a measurement range y. In a typical configuration for a water boiler operating at about 180 bar, 12 sensors with a spacing of 50 mm (x) would be employed to cover a measurement range of 550 mm (y).

As previously discussed, such an arrangement is prone to density error, and careful thermal design is required if the error is to be kept within reasonable limits. Unfortunately the best can be achieved is an error of about 15%, which is still significant in many applications. For the configuration described above, the density error at 180 bar may be plotted 30 (FIG. 3) and is found to increase with level, rising from approximately 3 mm at 100 mm level to 78 mm at 550 mm.

In accordance with the present invention, a vessel 40 (FIG. 4) has a non equal spacing between sensors, such as sensors 41 and 42. The spacing between sensors is in accordance with the following table, which values have been read from the plot 30 (FIG. 3). It will be understood that density errors are compensated such that the sensor placement is equivalent to equal fluid level increments in the boiler drum at operating pressure.

| SENSOR | SPACING | SPACING (mm) | EQUIVALENT LEVEL Increment (mm) (p) | COMPENSATION (mm) p. (1-e) |
|---|---|---|---|---|
| 41 | k | 50 | 50 | 0 |
| 42 | j | 47 | 50 | 3 |
| 43 | i | 46 | 50 | 4 |
| 44 | h | 45 | 50 | 5 |
| 45 | g | 44 | 50 | 6 |
| 46 | f | 43 | 50 | 7 |
| 47 | e | 42 | 50 | 8 |
| 48 | d | 41 | 50 | 9 |
| 49 | c | 40 | 50 | 10 |
| 50 | b | 38 | 50 | 12 |
| 51 | a | 36 | 50 | 14 |

In the above table sensor numbering is common with FIG. 4.

It will be appreciated that the spacing is correctly compensated only when the boiler drum is at substantially operating pressure but which is the condition where the more serious hazards can exist due to errors in water level indications. Under other conditions, for example cold filling, other compensation will be required. Under such non operating conditions, compensated values may for example be read from a correction chart, having a table of compensated values for the required conditions.

It will be realised that the sensors may be any suitable transducer capable of detecting the presence or absence of the fluid the level of which is being gauged.

Suitable transducers, and the way in which signals from them may be processed, will readily suggest themselves to those skilled in the art. Prior art systems are described for example in United Kingdom Pat. Specification Nos. 1,056,032, 1,257,737 and 1,438,271.

It has been found that in fluid level measurement systems including the present invention the thermal specification of the pressure vessel may be relaxed whilst preserving accuracy, thereby reducing the bulk and expense of the vessel. It has been found that the present invention is particularly effective in long vessels, which shape is normally not conducive to heat transfer (from the upper to lower regions).

The matter for which the applicant seeks protection is:

I claim:

1. Fluid level measurement apparatus for the measurement of fluid level in a container under normal operating conditions comprising: a pressure vessel connected to and communicating with the container through at least one conduit and arranged such that fluid in the container may enter the vessel so that fluid level in the vessel is representative of fluid level in the container; and a plurality of spaced apart fluid sensitive sensors mounted in the vessel, the apparatus calibrated such that spacings between at least two different vertically disposed pairs of sensors are unequal to each other and correspond to and differ from preselected increments of fluid level to be measured, wherein the calibrated spacings between sensors on the container are selected frrom values determined from known level errors arising from density difference between fluid in the container and fluid in the vessel as a result of temperature and pressure differences in the container and vessel, to compensate for said errors in fluid level measured by said apparatus.

2. Fluid level measurement apparatus as claimed in claim 1 wherein the spacings between sensors are selected to be equivalent to equal increments of level in the vessel.

3. Fluid level measurement apparatus as claimed in claim 1 wherein the spacing between sensors representing a first fluid level increment is less than that between sensors representing a second and lower fluid level increment.

4. Fluid level measurement apparatus as claimed in claim 1 wherein the increments of fluid level to be measured are selected each to be equal to an increment p., the sensor spacings being selected such that an $n^{th}$ sensor is mounted at level n.p. $(1-e)$, where e is given by $$e = \frac{V_1 - V_2}{V_s - V_2} \cdot \frac{V_s}{V_1}$$

and where $V_1$ is the specific volume of fluid in the container, $V_2$ is the specific volume of fluid in the vessel, and $V_s$ is the specific volume of saturated fluid vapor, all at normal operating pressure of the vessel and container.

* * * * *